(12) United States Patent
Ryan et al.

(10) Patent No.: US 8,406,759 B2
(45) Date of Patent: Mar. 26, 2013

(54) SYSTEMS AND METHODS FOR MANAGING RADIO RESOURCES UNSING EXTENDED MANAGEMENT INFORMATION BASES IN WIRELESS NETWORKS

(75) Inventors: David J Ryan, Seattle, WA (US); David B Gibbons, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 322 days.

(21) Appl. No.: 12/709,521

(22) Filed: Feb. 22, 2010

(65) Prior Publication Data

US 2010/0216467 A1    Aug. 26, 2010

Related U.S. Application Data

(60) Provisional application No. 61/155,111, filed on Feb. 24, 2009.

(51) Int. Cl.
*H04W 4/00* (2009.01)

(52) U.S. Cl. ............... 455/435.1; 455/435.2; 455/432.1; 455/422.1; 370/401; 370/252; 370/470; 370/422

(58) Field of Classification Search .............. 455/435.1, 455/435.2, 432.1, 422.1; 370/401, 252, 470, 370/422

See application file for complete search history.

(56) References Cited

U.S. PATENT DOCUMENTS

| | | | |
|---|---|---|---|
| 2007/0081459 A1 | 4/2007 | Segel et al. | |
| 2007/0127417 A1 | 6/2007 | Kalika | |
| 2007/0204156 A1* | 8/2007 | Jeghers | 713/168 |
| 2008/0013477 A1* | 1/2008 | Claussen et al. | 370/328 |
| 2008/0076412 A1 | 3/2008 | Khetawat et al. | |
| 2008/0298275 A1 | 12/2008 | De Sousa | |

OTHER PUBLICATIONS

International Search Report and Written Opinion for PCT/US2010/024852 filed on Feb. 22, 2010.

* cited by examiner

*Primary Examiner* — Charles Appiah
*Assistant Examiner* — Khai M Nguyen

(57) ABSTRACT

A networked computing system, including multiple radio access nodes (RANs), multiple radio communications controllers (RCCs), and a data communications network facilitating communications amongst the RANs and the RCCs of the system. A regional RAN receives a default eMIB associated with a first type of RAN (e.g., a macrocell, microcell, picocells, or femtocell RAN types) from a RCC, in response to a registration event of a RAN initialization process. The regional RAN maintains a dynamic eMIB comprising network operating parameters determined by various self-optimization processes. The network operating parameters of the dynamic eMIB are selected to fall within a range designated by the default eMIB. During a network failure condition, the regional RAN is configured to use a temporary eMIB comprising failure level operating parameters in order to mitigate network deficiencies caused by the network failure condition.

17 Claims, 7 Drawing Sheets

SYSTEMS AND METHODS FOR MANAGING RADIO RESOURCES UNSING EXTENDED MANAGEMENT INFORMATION BASES IN WIRELESS NETWORKS

CROSS REFERENCE TO RELATED APPLICATIONS

The present application claims the benefit of U.S. Provisional Application No. 61/155,111, filed Feb. 24, 2009.

FIELD OF THE INVENTION

The field of the present invention generally relates to systems and methods for facilitating automated radio resource management in self-optimizing wireless networks. Specifically, the present invention relates to emerging 4G self-organized networks (SON networks), where manual intervention on the part of service providers and end users can be significantly reduced or eliminated altogether as a result of employing robust radio resource management solutions.

BACKGROUND OF THE INVENTION

Modern wireless communications networks include many different network topologies comprising heterogeneous mixtures of macrocell, microcell, picocell, and femtocell resources. At the highest level of wireless coverage, a macrocell provides cellular service for a relatively large physical area, often in areas where network traffic densities are low. In more dense traffic areas, a macrocell may act as an overarching service provider, primarily responsible for providing continuity for service area gaps between smaller network cells. In areas of increased traffic density, microcells are often utilized to add network capacity and to improve signal quality for smaller physical areas where increased bandwidth is required. Numerous picocells and femtocells generally add to network capacity for even smaller physical areas in highly populated metropolitan and residential regions of a larger data communications network.

As would be understood by those skilled in the Art, in all wireless service provider networks, macrocells typically provide the largest wireless coverage area for licensed frequency spectra, followed by microcells, then picocells, and lastly femtocells. By way of example, in a typical wireless data communications network, a macrocell base station may provide a wireless coverage area ranging between one to five kilometers, radially from the center of the cell; a microcell base station may provide a coverage area ranging between one-half to one kilometer radially; a picocell base station may provide a coverage area ranging between 100 to 500 meters radially; and a femtocell base station may provide a coverage area of less than 100 meters radially. Each of these network cell or base station types is generally configured to connect with a particular service provider network using various common wireline communications technologies, including, but not limited to: fiber optic, twisted pair, powerline, and/or coaxial cable (joining cells to a backhaul network).

In modern data communications networks comprising many different types of network cells, it is becoming more and more complex to properly provision, manage, and optimize distributed network resources in a cost effective manner. Traditional radio access network parameter management is carried out through a centralized controller where radio resource parameters are stored in individual network resource Management Information Bases (MIBs). These master MIBs are usually maintained in a central Network Operations Center (NOC) at some remote network location, such as a backhaul portion of a distributed communications network. As would be understood by those skilled in the Art, in most digital communications networks, the backhaul portion of the network may comprise the intermediate, generally wireline, links between a backbone of the network, and the sub-networks or network cells located at the periphery of the network. For example, cellular user equipment communicating with a cell base station may constitute a local sub-network or cell. Whereas the network connection between the base station and the rest of the world initiates with a link to the backhaul portion of a access provider's network (e.g., via a point of presence).

Initially, these master MIBs may be populated with default parameter settings, including, but not limited to, any of the following network parameters/settings listed in Table 1. Those skilled in the Art would be aware of the purpose and provisioning assignments necessary for managing any of these optional MIB parameters:

TABLE 1

| Network Parameters: |
| --- |
| Network ID and address |
| Backhaul routing information |
| Base station network permissions |
| Network management parameters |
| Base Station RF Parameters: |
| Operating channel |
| Radio configuration |
| Transmit power settings |
| Transmit and receive timing/framing parameters |
| Access parameters |
| Protocol Parameters: |
| Message retry limits |
| Retry timers |
| General Base Station Parameters: |
| Base station location |
| Time base information |
| Hardware initialization parameters |
| Redundancy settings |
| Base Station Airlink Parameters: |
| Base station ID |
| Neighbor list |
| Broadcast channel messages |
| Handover parameters |

The listing of network parameters in Table 1 could be more exhaustive or more consolidated, depending on the network technology employed and the resources being provisioned within various network cells, however, these parameters give a high level example of the type of network base station parameters that may need to be designated (e.g., as a component of a MIB) and/or frequently optimized within a network base station to allow it to operate properly and efficiently within a given network area. In practice, many of the parameters in master MIBs are designated by the equipment manufacturers whom may preset upwards of 95% of the individual parameters for a given network resource, leaving the remaining percentage of undesignated parameters to depend on specific hardware configurations and device capabilities, as well as network service provider specified preferences. Some parameters that can be designated by service provider preference may include parameters related to a licensed frequency band and field-specific optimization parameters, including: transmit power, neighbor lists, handover thresholds, any of the parameters listed above in Table 1, as well as any other network parameters that may be manually provisioned as result of network engineering and manual network optimization activities.

As one example of a manual optimization process, in many existing cellular networks, service providers utilize mobile network resource testing vehicles to periodically gather information to help them manually compensate for the effects of real-world radio frequency isolation contributors and neighboring interference sources. These compensation techniques may allow for service providers to effectively reprovision and/or optimize network resources by determining new, real-time parameter adjustments that can be manually applied to and employed by various network radio access nodes (RANs), such as macrocell, microcell, picocell, and femtocell base stations. Unfortunately, these mobile testing solutions require manual operation as well as manual radio operating parameter adjustment at network resource sites. These largely iterative solutions are also expensive to routinely employ, and they are too infrequently utilized to keep up with dynamically changing network resources and environments. Accordingly, manual testing and compensation techniques (e.g., those employing parameter updating in master MIBs) are inadequate solutions for effectively determining and neutralizing many of the negative effects associated with dynamically changing network environments, which are becoming more and more complex with the rapid deployment of an increasing numbers of smaller network cells in evolving wireless communications networks (e.g., with the evolution of 4G communications networks).

These evolving network topologies may result in robust mixtures of network cell coverages within regions of overlapping wireless service. In particular, many modern, low power base stations (e.g., picocell and femtocell devices base stations) are readily transportable within an existing communications network by end users. This mobility can create a situation where many smaller cell base stations may be moved to unpredictable locations within a network where their operation could potentially produce substantial interference to surrounding network infrastructure, unless their maximum radio power levels were constrained to reduce unwanted instances of network interference. These ad-hoc cell deployments are difficult to model, because end users often do not register their devices' new locations with their local service providers. As a result, modern mobile network resource optimization solutions are not utilized frequently enough to timely learn of their presence and then compensate for their interfering affect within a particular network cell (e.g., by adjusting network resource parameters at various network cell base stations).

In modern data communications networks, typically after a network resource (e.g., such as a RAN) is discovered in a network by a controller device or service provider entity, it can only be managed if its local MIB is available and is accessible by the resource's operations management software. If the network resource's MIB is not available, a vendor must be contacted to obtain the required compatible MIB. This manual process may take hours to days for completion. Until the proper MIB is obtained, and optionally custom-provisioned, the discovered RAN is not manageable. Another problem that can arise is if a master MIB for a discovered device is not of the correct version associated with a particular RAN type. In this case, a network controller may not be able to coherently manage the features of the RAN, particularly as a given network evolves (e.g., with the addition of many new smaller network cells).

Accordingly, it would be helpful to be able have improved systems and methods that can facilitate the management of individual RAN resource parameters in a self-optimizing wireless network (e.g., in self-organizing cellular networks). It would be helpful if these systems and methods could support default power up parameter assignment, uncomplicated control and override of specific parameters, defined ranges and permissible operating conditions for subsequent self-optimization operations, localized update of defined parameters via self-optimization algorithms, and network rollback to known operating states as necessary to assure system stability (e.g., in response to a network failure condition). It would also be helpful to be able to utilize existing network resources (e.g., distributed RANs) to account for actual network resource operating conditions, in order to facilitate accurate provisioning and determination of network radio operating parameters between and amongst various network base stations. It would further be advantageous if these improved solutions enhanced radio access network performance by employing optimized RAN management utilities in a dynamic network environment. These improved, self-optimizing network utilities would effectively automate processes that were previously largely manual tasks, thereby reducing the level of required human intervention for successful network operations. This would result in operational and/or deployment savings and it would provide for many other performance, quality, and operational benefits. The importance of these benefits would be readily understood by those familiar with the multitude of benefits commonly associated with self-organized network (SoN) solutions.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with existing radio resource parameter management systems, the present invention discloses systems and methods for managing network radio resources using extended management information bases (eMIBs). In accordance with an embodiment of the present invention, is a networked computing system including multiple radio access nodes (RANs), multiple radio communications controllers (RCCs), and a data communications network, facilitating data communications amongst the RANs and the RCCs of the networked computing system. A first RAN receives a default eMIB associated with a cell type of the first RAN from a RCC, in response to a registration event of a RAN initialization process.

In accordance with one aspect of the invention, a second RAN receives a default eMIB associated with a cell type of second RAN from the RCC in response to a registration event of another RAN initialization process.

In accordance with a further aspect of the invention, the RCC maintains default eMIBs associated with macrocell, microcell, picocells, and femtocell RANs.

In accordance with another aspect of the invention, the first RAN maintains a dynamic eMIB comprising network operating parameters determined by one or more self-optimization process(es).

In accordance with another aspect of the invention, a network operating parameter of the dynamic eMIB is selected to fall within a range designated by the default eMIB associated with the cell type of the first RAN.

In accordance with yet a further aspect of the invention, wherein in response to a network failure condition, the first RAN is instructed by another RCC to save a copy of its dynamic eMIB, such that it can revert back to using the saved copy of the dynamic eMIB during a failure recovery process.

In accordance with a another aspect of the invention, wherein during a network failure condition, the first RAN is configured to use a temporary eMIB comprising failure level operating parameters, to mitigate network deficiencies caused by the network failure condition.

In accordance with a further aspect of the invention, is a computer-readable medium encoded with computer-executable instructions that utilize extended management information base (eMIB) data to optimize network resources, which when executed, performs the method including the following processes: registering a first radio access node (RAN) with a radio communications controller (RCC) during a RAN initialization process, and receiving a default eMIB associated with the cell type of the first RAN at the first RAN, in response to the registration.

In accordance with another aspect of the invention, is a computer-implemented method, that utilizes extended management information base (eMIB) data to optimize network resources, the method including the following processes: registering a first radio access node (RAN) with a radio communications controller (RCC) during a RAN initialization process, and receiving a default eMIB associated with the cell type of the first RAN at the first RAN, in response to the registration.

BRIEF DESCRIPTION OF THE DRAWINGS

Preferred and alternative examples of the present invention are described in detail below with reference to the following Figure drawings.

DETAILED DESCRIPTION

Figure 1:
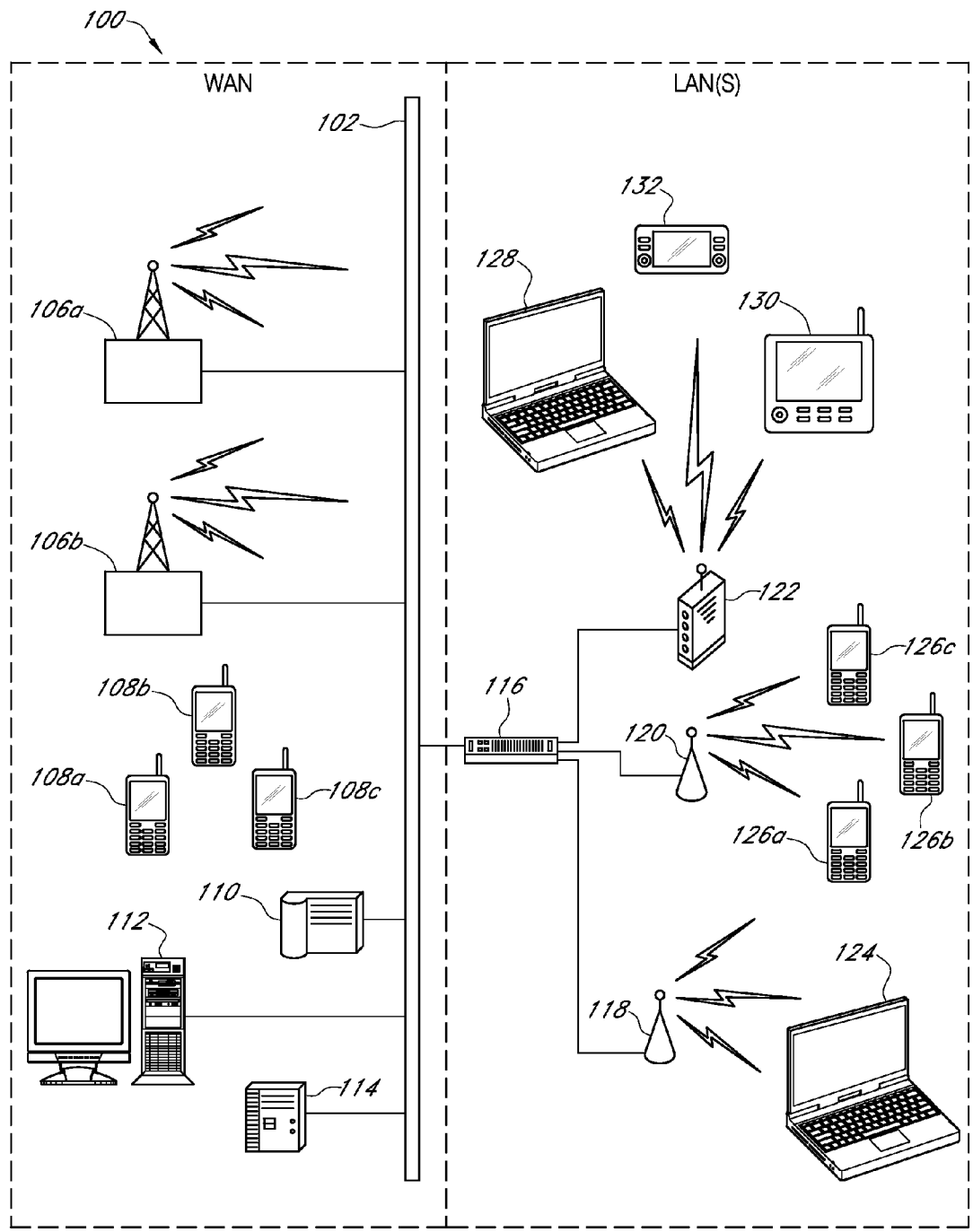
FIG. 1 illustrates a perspective view of a distributed data communications network in accordance with an embodiment of the present invention.

In accordance with an exemplary embodiment of the present invention, FIG. 1 illustrates a network computing system 100 including various wireline and wireless computing devices that may be utilized to implement any of the radio resource parameter management and cell provisioning processes associated with various embodiments of the present invention. The networked computing system 100 may include, but is not limited to, a group of service provider controller devices 110, 112, and 114 (also referred to here as Radio Communications Controllers or RCCs); remote base stations 106a-b that may be associated with larger cells (e.g., macrocells and/or microcells) and may be overarching and/or neighboring base stations to any of the other smaller base stations 118, 120, and 122 within a particular region of the networked computing system 100; multiple remote user equipment 108a-c (e.g., optionally including cell phones, PDAs, net books, electronic book devices, etc.) that may be provided service by any of the remote base stations 106a-b; a data communications network 102, including both Wide Area Network (WAN) and Local Area Network (LAN) portions; one or more network gateways, routers, or switch devices 116 that can facilitate data communications processes within the LAN and between the LAN and the WAN of the data communications network 102; local base stations 118, 120, and 122 that may be associated with smaller cells (e.g., picocells and femtocells), that can provide wireless service to any number or type of local user equipment 124, 126a-c, 128, 130, and 132; and a variety of local wireless user equipment, including: a net book computer 124, a variety of cellular phone and/or PDA devices 126a-c, a laptop computer 128, an electronic book device 130, a handheld gaming unit 132, along with any other common portable wireless computing device well known in the art (e.g., personal music players, video recorders, tablet computers, etc.) that are capable of communicating with the data communications network 102 utilizing wireless services provided by one or more of the remote or local base stations 106a-b, 118, 120, and 122, or any other common wireless or wireline network communications technology.

In an embodiment, any of the service provider controller devices 110, 112, and 114, and/or network base stations 106a-b, 118, 120, and 122 (also referred to herein as Radio Access Nodes or RANs) may function, independently or collaboratively, to implement any of the radio resource parameter management and cell provisioning processes associated with various embodiments of the present invention. Further, any of the radio resource parameter management and cell provisioning processes may be carried out by any common communications technologies known in the Art, such as those technologies common to modern Global Systems for Mobile (GSM), Universal Mobile Telecommunications System (UMTS), and Long Term Evolution (LTE) network infrastructure. In accordance with a standard GSM network, any of the service provider controller devices 110, 112, and 114 may be associated with a base station controller (BSC), a mobile switching center (MSC), or any other common service provider control device known in the art, such as a radio resource manager (RRM). In accordance with a standard UMTS network, any of the service provider controller devices 110, 112, and 114 may be associated with a radio network controller (RNC), a serving GPRS support node (SGSN), or any other common service provider controller device known in the art, such as a radio resource manager (RRM). In accordance with a standard LTE network, any of the service provider controller devices 110, 112, and 114 may be associated with an eNodeB base station, a mobility management entity (MME), or any other common service provider controller device known in the art, such as a radio resource manager (RRM).

In an embodiment, any of the service provider controller devices 110, 112, and 114, the network base stations 106a-b 118, 120, and 122, as well as any of the user equipment 108a-c, 124, 126a-c, 128, 130, and 132, may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, any of the service provider controller devices 110, 112, and 114, or any of the remote base stations 106a-b may employ any number of common server, desktop, laptop, and personal computing devices.

In an embodiment, any of the user equipment 108a-c, 124, 126a-c, 128, 130, and 132, may include any combination of common mobile computing devices (e.g., laptop computers, net book computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions (e.g., the backhaul or local portions) of the data communications network 102 of FIG. 1 may employ any of the following common communications technologies: optical fiber, coaxial cable, twisted pair cable, Ethernet cable, and powerline cable, along with any wireless communication technology known in the art. In an embodiment, any of the service provider controller devices 110, 112, and 114, the network base stations 106a-b, 118, 120, and 122, or user equipment (108a-c, 124, 126a-c, 128, 130, and 132), may include any standard computing software and hardware necessary for processing, storing, and communicating data amongst each other within the networked computing system 100. The computing hardware realized by any of the network computing system 100 devices (106a-b, 108a-c, 110, 112, 114, 116, 118, 120, 122, 124, 126a-c, 128, 130, or 132) may include, but is not limited to: one or more processors, volatile and non-volatile memories, user interfaces, transcoders, modems, wireline and/or wireless communications transceivers, etc.

Further, any of the networked computing system 100 devices (106a-b, 108a-c, 110, 112, 114, 116, 118, 120, 122, 124, 126a-c, 128, 130, or 132) may be configured to include one or more computer-readable media (e.g., any common volatile or non-volatile memory type) encoded with a set of computer readable instructions, which when executed, performs a portion of any of the radio resource parameter management and cell provisioning processes associated with various embodiments of the present invention.

In context with various embodiments of the present invention, it should be understood that wireless communications coverage associated with various data communication technologies (e.g., RANs) and cell types typically vary amongst different service provider networks based on the type of network and the system infrastructure deployed within a particular region of a network (e.g., differences amongst GSM, UMTS, and LTE networks and the resources deployed in each network type). As would be understood by those skilled in the Art, within all wireless networks, macrocells typically provide the largest wireless coverage area for licensed frequency spectra, followed by microcells, then picocells, and lastly femtocells. Determining whether a cell is considered a larger cell or a smaller cell is primarily based on a reference cell to which the cell in question in being compared. For example, a microcell may be considered to be a smaller cell compared to a macrocell and a larger cell compared to both a picocell and a femtocell Likewise, a picocell may be considered to be a smaller cell compared to both a macrocell or a microcell and a larger cell compared to a femtocell. Further, one picocell may be considered to be a larger cell than another picocell, based on coverage area comparison between the two picocells and the technologies employed at the cells. In general, when comparing dissimilar cell types, a macrocell is always considered to be a larger cell, and a femtocell is always considered to be a smaller cell.

Figure 2:
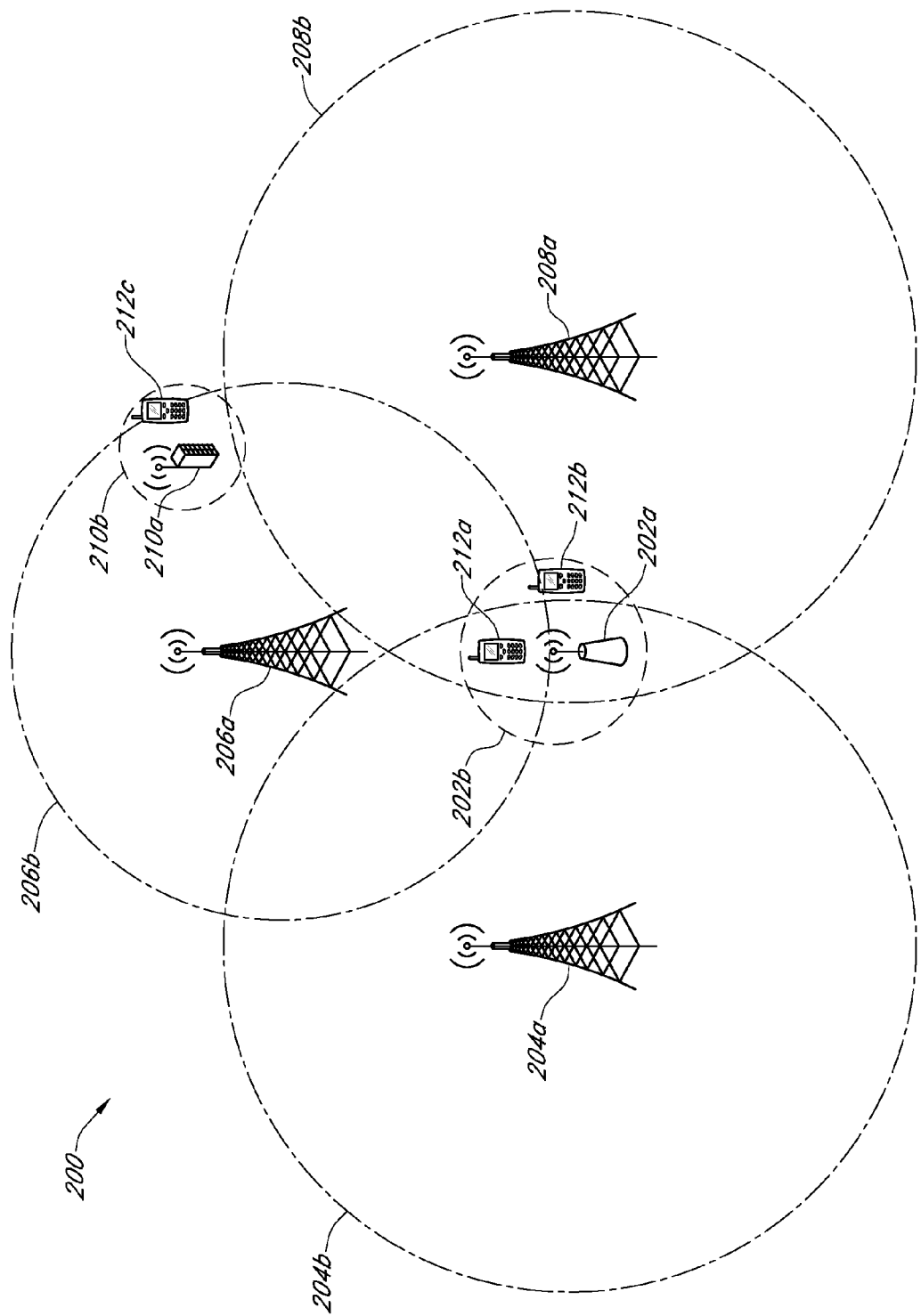
FIG. 2 illustrates a network topology comprising various network base stations and various user equipment geographically positioned amongst the network base stations, in accordance with an embodiment of the present invention.

FIG. 2 illustrates a network topology 200 comprising various network base stations (202a, 204a, 206a, 208a and 210a) that may be part of a larger distributed data communications network. The network cells and user equipment depicted in FIG. 2 may be representative of any of the RANs (106a-b, 118, 120, and 122) or user equipment (108a-c, 124, 126a-c, 128, 130, and 132) depicted in FIG. 1. In an embodiment, the network topology 200 may be consistent with any of a common GSM, UMTS, or LTE network topology. In particular, the network topology 200 depicts overlaying cell coverage areas amongst various network cell types (e.g., macrocells, microcells, picocells, and femtocells) and various user equipment 212a-c that are independently distributed within the coverage areas of multiple network RANs 202a, 204a, 206a, and 208a. In an embodiment, user equipment 212a, which may be representative of any of the user equipment (108a-c, 124, 126a-c, 128, 130, and 132) of FIG. 1, is geographically positioned within the cell coverage areas (202b, 204b, 206b and 208b) of four different network RANs (202b, 204b, 206b and 208b). User equipment 212b, which may be representative of any of the user equipment (108a-c, 124, 126a-c, 128, 130, and 132) of FIG. 1, is geographically positioned within the cell coverage areas (202b, 206b and 208b) of three different RANs (202b, 206b and 208b). User equipment 212c, which may be representative of any of the user equipment (108a-c, 124, 126a-c, 128, 130, and 132) of FIG. 1, is geographically positioned within the cell coverage areas (206b and 210b) of two different RANs (206b and 210b).

In this scenario, various service provider entity controller devices (e.g., RRCs, not shown) may be configured to initially provision any of network RANs (202a, 204a, 206a, 208a, and 210a) with a default management information base (MIB) that may be populated with default parameter settings, including, but not limited to, any of the following network parameters/settings listed in Table 1. Those skilled in the Art would be aware of the purpose and provisioning assignments necessary for managing and optimizing any of the MIB parameters/settings in Table 1. In an embodiment, any of the RCCs may maintain various extended MIBs (also referred to herein as eMIBs) that correspond to the cell types of any of the network RANs (202a, 204a, 206a, 208a, and 210a). For example, a particular RRC may comprise a repository for RAN eMIBs (e.g., the default eMIB repository 412 of RRC 400) associated with various macrocell, microcell, picocell, and femtocell technologies being utilized within a particular network. Further, any of the RANs (202a, 204a, 206a, 208a, and 210a) may be configured to include or to generate a dynamic eMIB that can be adjusted to be compatible with their corresponding default eMIB configurations within a permissible range of parameter variation or tolerance.

In accordance with various embodiments of the invention, that will be made more apparent herein, the dynamic eMIB may be automatically updated in response to results generated by various RAN self-optimization processes/algorithms that may be manually or automatically run to ensure a particular RAN (e.g., RAN 208a) is operating as efficiently as possible within a given network region, without causing substantial radio interference to any neighboring network RANs (e.g., RANs 202a, 206a, 210a). In an embodiment, some parameters of a particular RAN's dynamic eMIB may be automatically or manually adjusted through various self-optimization processes associated with independent RANs of self-organizing networks (SON networks). These parameters may be related to parameter designations for licensed frequency band assignment or for designating various field-specific optimization parameters, including: transmit power levels, neighbor RAN lists, handover thresholds, etc.

Network RANs, 204a and 208a, may be associated with provisioned macrocells (having default eMIBs associated with a macrocell cell type that were provided by a service provider RCC 400, and dynamic eMIBs configured to operate within acceptable tolerances indicated by their respective default eMIBs) providing wireless coverage areas, 204b and 208b, having a radial coverages ranging between one to five kilometers; network RAN 206a may be associated with a provisioned microcell (having a default eMIB associated with a microcell cell type that was provided by a service provider RCC 400, and a dynamic eMIB configured to operate within an acceptable tolerance as indicated by its default eMIB) providing a wireless coverage area 206b, having a radial coverage ranging between one-half to one kilometer; network RAN 202a (having a default eMIB associated with a pico cell type that was provided by a service provider RCC 400, and a dynamic eMIB configured to operate within an acceptable tolerance indicated by its default eMIB) may be associated with a picocell providing a wireless coverage area 202b, having a radial coverage ranging between 100 to 500 meters; and network RAN 210a (having a default eMIB associated with a femtocell cell type that was provided by a service provider RCC 400, and a dynamic eMIB configured to operate within an acceptable tolerance indicated by its default eMIB) may be associated with a femtocell providing a wireless coverage area 210b having a radial coverage ranging less than 100 meters.

Figure 3:
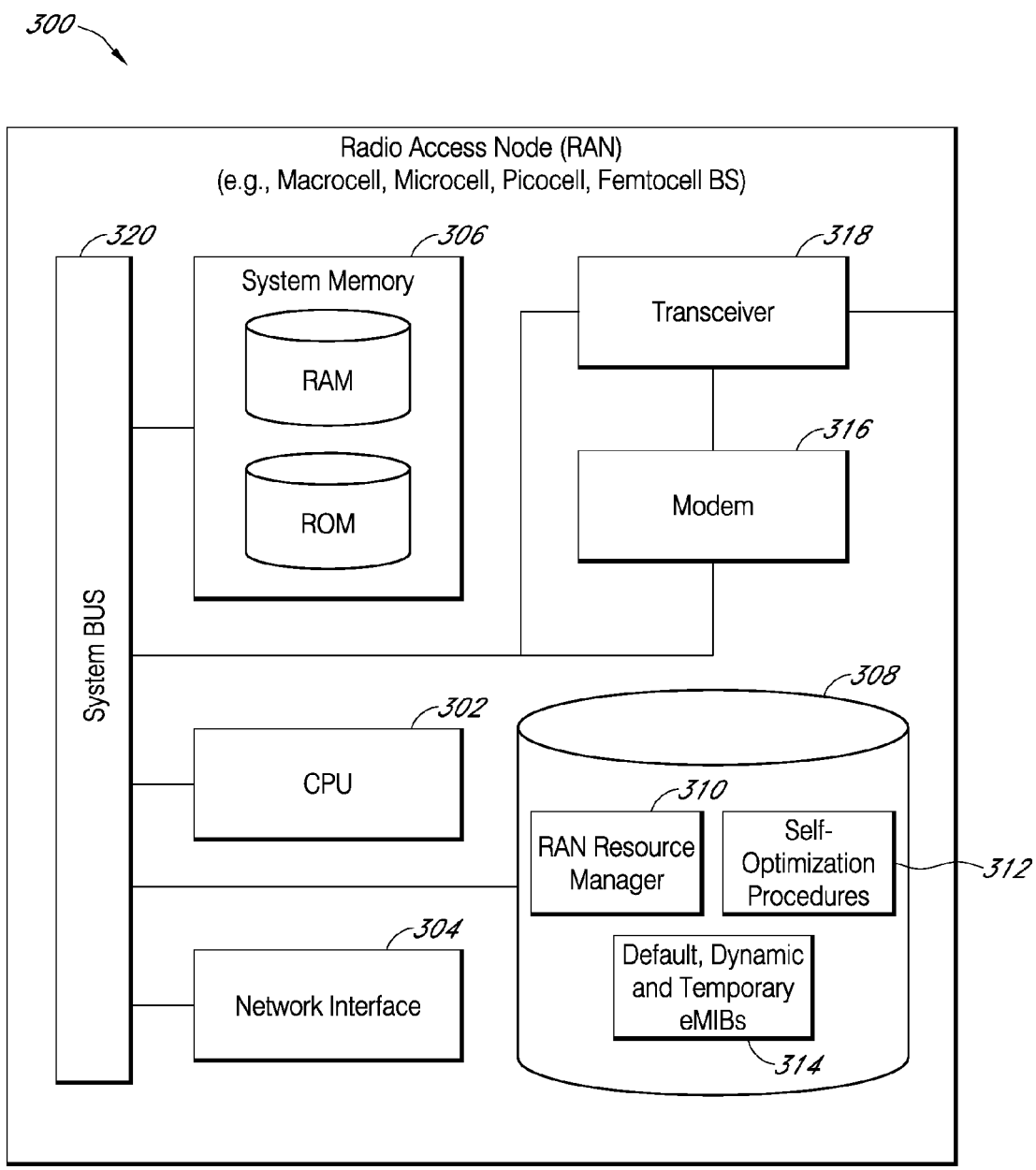
FIG. 3 illustrates a block diagram of a radio access node (RAN) in accordance with an embodiment of the present invention.

FIG. 3 illustrates a block diagram view of a RAN 300 that may be representative of any of the base stations (106a-b, 118, 120, 122, 202a, 204a, 206a, 208a, and 210a) depicted in FIG. 1 or 2. In accordance with an embodiment of the present invention, the RAN 300 may be associated with a macrocell, a microcell, a picocell, or a femtocell, and it may include, but is not limited to, one or more data processing devices including a central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 may be responsible for executing all computer programs stored on the RAN's 300 volatile (RAM) and nonvolatile (ROM) system memories, 306 and 308.

The RAN 300 may also include, but is not limited to, a network interface 304 that can facilitate the RAN's 300 communication with the backhaul 102 portion or the wireless portions of the network computing system 100 of FIG. 1; a software/database repository 308 including: a RAN resource manager component 310, a repository storing the one or more default eMIB, dynamic eMIB, and temporary eMIB 314, and a software-based self-optimization procedure component 312; a modem 316 for modulating any analog carrier signal to encode digital information and for demodulating a carrier signal to decode digital information; a wireless transceiver component 318 for transmitting and receiving network communications to and from various network resources, including any of the service provider controller devices 110, 112, and 114, the neighbor network base stations 106a-b, 118, 120, and 122, or network user equipment (108a-c, 124, 126a-c, 128, 130, and 132); and a system bus 320 that facilitates data communications amongst all the hardware resources of the RAN 300.

In accordance with an embodiment of the present invention, the RAN 300 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the RAN 300 may be configured to communicate with the user equipment (e.g., 108a-c, 124, 126a-c, 128, 130, and 132) via any Cellular Data Communications Protocol, including any common GSM, UMTS, WiMAX or LTE protocol.

In accordance with an embodiment, the RAN resource manager component 310 may be configured to manage some or all of the RAN's radio operating resources by optimizing its dynamic eMIB (in accordance with tolerances specified in the default eMIB) in collaboration with the self-optimization procedure component 312, when various RAN parameters need to be updated in the dynamic eMIB (e.g., in response to SON determinations of favorable RAN operating parameters). Further, the resource manager component 310 may employ a temporary eMIB during a network failure condition, such that RAN operations (e.g., radio power levels and MCS levels) could be adapted compensate for network deficiencies associated with the network failure condition. In an embodiment, the software-based, self-optimization procedure component 312, may be configured to optimize/update: neighbor RAN lists based on local measurements, preferred channel list based on local measurements, handover threshold settings based on local handover success/failure history, and access parameter settings based on local call success/failure history.

Figure 4:
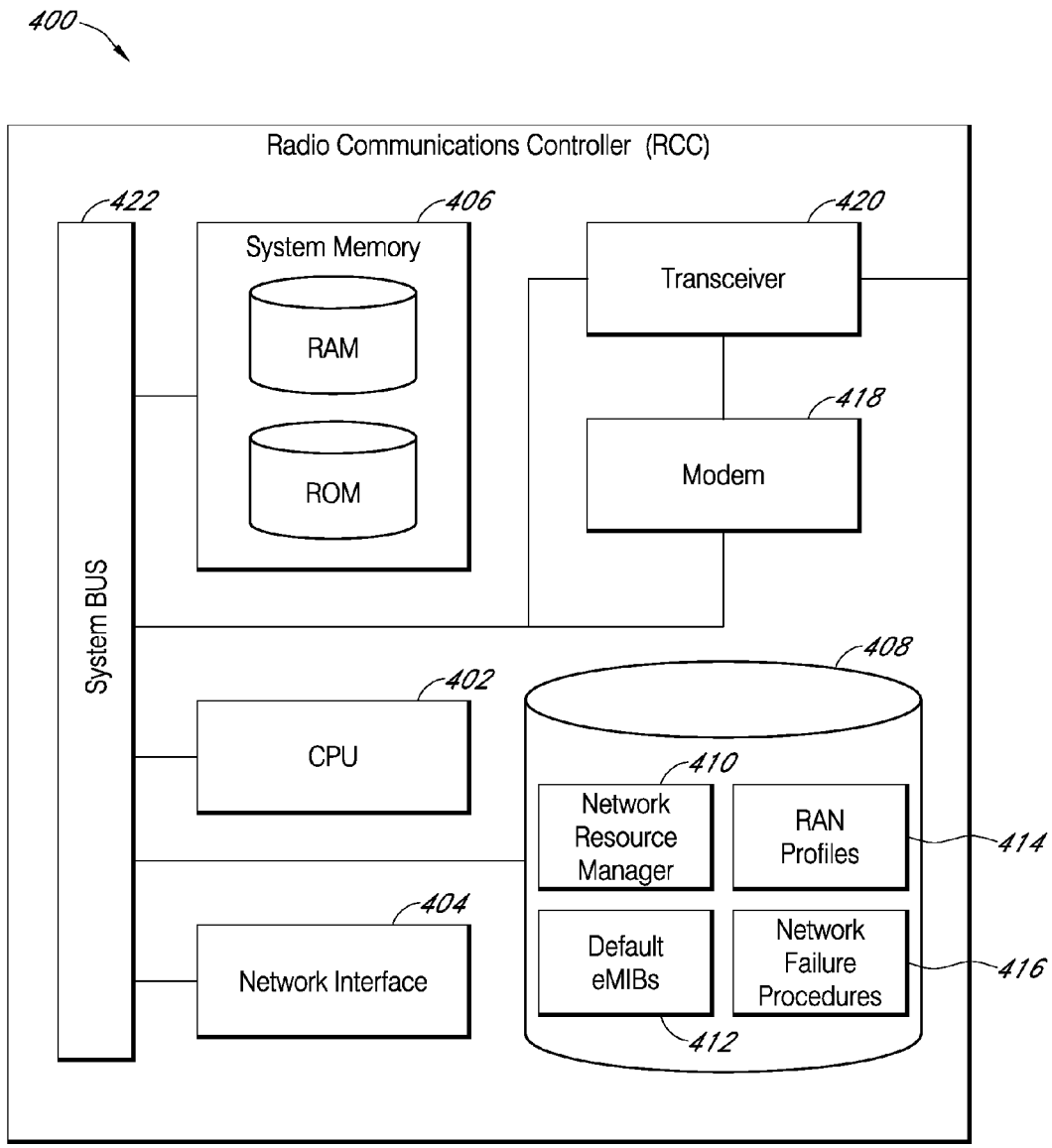
FIG. 4 illustrates a block diagram of a radio communications controller (RCC) in accordance with an embodiment of the present invention.

FIG. 4 illustrates a block diagram view of a Radio Communications Controller (RCC) 400 that may be representative of any of the service provider controller devices 110, 112, and 114, or optionally any of the macro-level base stations of FIG. 1 or 2, having network controller functionality. In accordance with an embodiment of the present invention, the RCC 400 may include, but is not limited to, one or more data processing devices including a central processing unit (CPU) 402. In an embodiment, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 may be responsible for executing all computer programs stored on the RCC's 400 volatile (RAM) and nonvolatile (ROM) system memories, 406 and 408.

The RCC 400 may also include, but is not limited to, a network interface 404 that can facilitate the RCC's 400 communication with the backhaul 102 portion or the wireless portions of the network computing system 100 of FIG. 1; a software/database repository 408 including: a network resource manager 410, a repository storing the one or more default eMIBs and/or master eMIBs 412, a repository of RAN profiles 414 storing various location and operation based information for each network RAN 300 associated with a particular service provider, and a software-based network failure procedure component 416; a modem 418 for modulating any analog carrier signal to encode digital information and for demodulating a carrier signal to decode digital information; a wireless transceiver component 420 for transmitting and receiving network communications to and from various network resources, including any of the service provider controller devices 110, 112, and 114, the neighbor network base stations 106*a-b*, 118, 120, and 122, or network user equipment (108*a-c*, 124, 126*a-c*, 128, 130, and 132); and a system bus 422 that facilitates data communications amongst all the hardware resources of the RCC 400.

In accordance with an embodiment, the network resource manager 410 may be configured to read RAN profile information in the RAN profile repository 414 to determine which default eMIBs to provision various distributed network RANs with during RAN provisioning procedures (e.g., provisioning RANs with any of the network parameters listed in Table 1). The network resource manager 410 may further be configured to collaborate with the software-based network failure procedure component 416 to manage and mitigate a network failure condition. In an embodiment, the network resource manager 410 may instruct one or more network RANs as when to employ their respective, resident temporary eMIBs as well as how each temporary eMIB should be provisioned to adequately compensate for the network failure condition.

In accordance with an embodiment of the invention, one of the advantageous features of the parameter management functions associated with the invention is that sets of default radio operation parameters may be stored in distributed eMIBs at various network resource site locations. These parameters (e.g., those depicted in Table 1) may have associated permissions, ranges, and in some cases: discrete allowed settings defined by a network service provider or a self-optimized network resource within a particular RAN's eMIB. In an embodiment, the network eMIBs may each be associated with a particular class of radio access equipment, including macrocell, microcell, picocell, and femtocell devices. For instance, a self-optimized, multi-tier radio access network may have defined eMIBs for macro, micro, pico and femto RANs, each with its own default parameters appropriate for the equipment technology being utilized.

In an embodiment, these default eMIBS may also carry parameter range limits or discrete allowable settings such as: maximum and minimum power settings, allowable frequencies of operation, preferred radio channels (resource blocks), etc. The default eMIBs may also define the rates and step sizes at which the ranges, limits, or parameter settings would be allowed to vary/change. Each eMIB parameter may also have an associated automation permissions field which could allow or deny localized self-optimization of associated parameter(s) under control of software algorithms localized to each network RAN.

In an embodiment, these default eMIBs may be downloaded to each RAN from a RCC during automated registration and authentication procedures (e.g., a plug and play event associated with a particular class of network RAN) to form the basis for both a default configuration to support a system restore to a known state, and to appropriately set seed parameters to local self-optimization processes. A copy of each default eMIB may be maintained in each RAN and may be used to store actual run-time parameters, modified by local self-optimization routines, having limits defined by default eMIB range values and permissions.

In an embodiment, various network self-optimization routines are expected to gradually alter specific radio access parameters in a time-varying manner and in response to localized radio performance metrics in both stable and evolving networks. For example, RAN transmit power may be varied gradually in a time-varying fashion within limits defined in a default eMIB in order to optimize the coverage reliability of the RAN, driven by locally obtained metrics including user equipment signal strength reporting. Radio access node neighbor lists may similarly be updated over time as nearby RANs come on line, or in response to seasonal changes in radio propagation conditions. From a system stability standpoint these algorithms may respond relatively slowly over time with adaptation time constants on the order of hours and days opposed to seconds or milliseconds. The present invention may have the ability to centrally inhibit some or all of the network RAN self-optimization functions via the parameter management structure described herein. Further the present invention provides a mechanism for network operators to "freeze" the configuration of any or all radio access nodes that converge to a desired operating state. This level of control can enhance system redundancy and network stability in evolving communications networks.

In an embodiment, during a localized network failure condition, such as failure of an overlapping coverage region in a multi-tiered access network, the extended eMIB structure may provide a framework to stop the current state of the real time dynamic eMIB and store its current configuration until a network recovery has been achieved. When an alarm indicating a nearby radio access node failure has been detected, is initialized at a RCC or a RAN, the device's neighboring RANs may be instructed to suspend regular, ongoing self-optimization routines, store their real-time dynamic eMIB (locally or at a RCC location, for later retrieval), and temporarily move to self healing operations. During this self-healing time, optimization routines may be accelerated by increasing selected RAN radio operating levels to mitigate a network failure. Temporary radio access parameters may be stored in a temporary fault state eMIB. In an embodiment, the radio resource parameters in the temporary eMIB are generally set at higher radio operating levels in operational RANs (local to a fault location) to compensate for the network deficiency.

Upon resolution of failure condition(s) by a central network entity, such as a RCC, the fault may be cleared by taking the failed cell offline or reinstating the cell after its failure condition has been cured. In the case of cell reinstatement, the stored dynamic eMIB may be reinstated and normal run-time self-optimization routines may be resumed. This parameter management methodology is offered as a means to provide centralized control as necessary during network recovery procedures, and to provide means for localized parameter optimization in self-optimizing radio access network topologies. Key design elements and benefits associated with the present invention, may include the existence of default eMIBs defined by equipment class and/or geographical area (e.g., via legal band maps or multi-band access nodes), centralized definition of permissions and valid adjustment ranges, localized ability to modify eMIB parameters via self-optimization algorithms, ability to rollback to a known stable configuration, and the ability to temporarily suspend long term self-optimization values in response to localized system faults.

Figure 5:
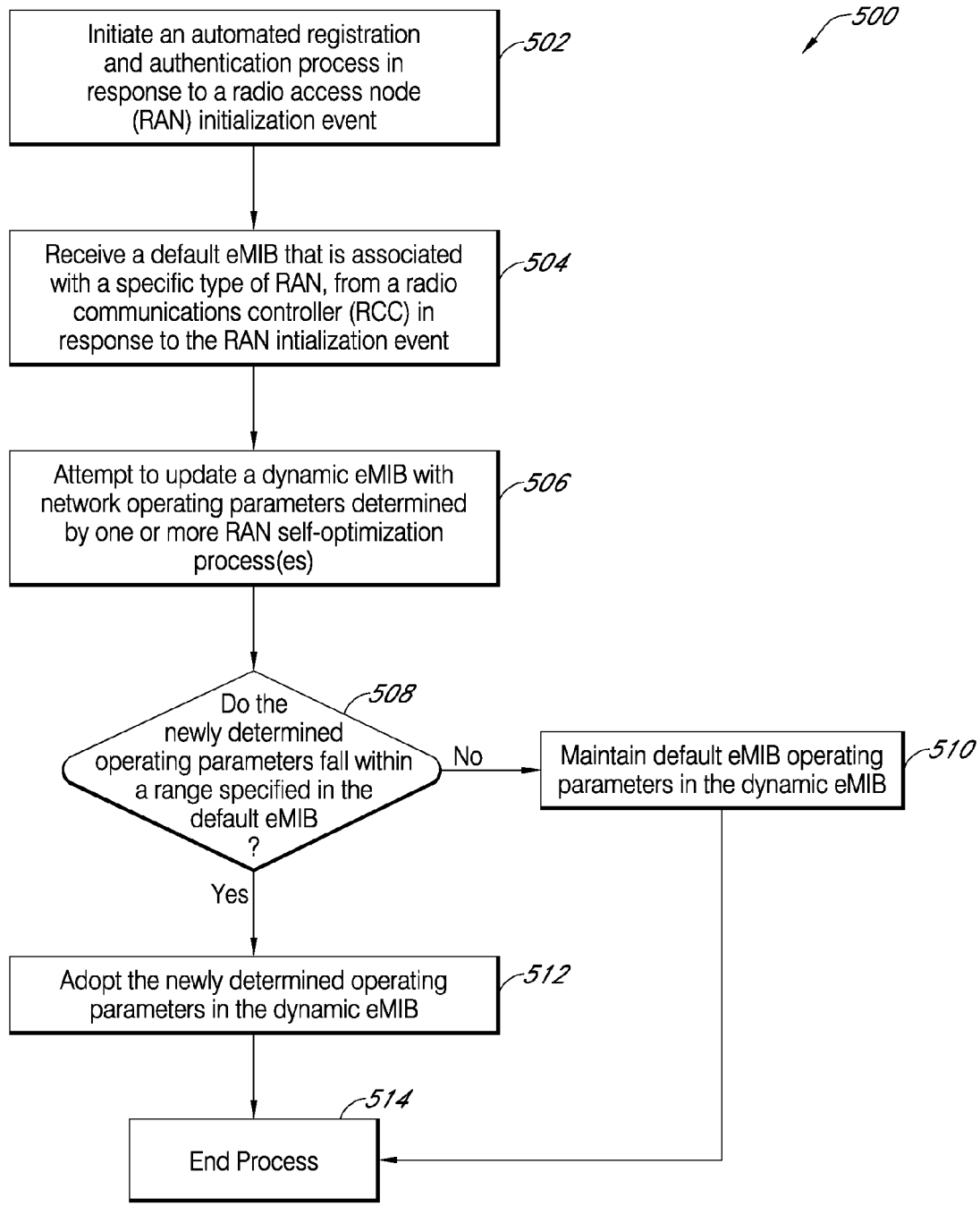
FIG. 5 illustrates a flow diagram depicting an automatic RAN eMIB configuration process, occurring in response to a RAN initialization event, in accordance with an embodiment of the present invention.

FIG. 5 illustrates a flow diagram 500 depicting an automatic RAN eMIB configuration process, occurring in response to a RAN initialization event, in accordance with an embodiment of the present invention. It should be understood that this process 500 could be executed using one or more computer-executable programs stored on one or more computer-readable media located on any of the network computing system's 100 base stations 106*a-c*, 118, 120, and 122 and/or controller devices 110, 112 and 114 of FIG. 1. At block 502, an automatic RAN registration and authentication process is initiated in response to a RAN initialization event. Next, at block 504, a network RAN 300 receives a default eMIB that is associated with a specific type of RAN, from a RCC 400, in response to a RAN initialization event. Subsequently, at block 506, the receiving RAN 300 may attempt to update its dynamic eMIB with network operating parameters determined by one or more RAN self-optimization processes (e.g., updating a dynamic eMIB with any of the operating parameters listed in Table 1).

At decision block 508 it is determined if the newly provisioned/determined operating parameters fall within a specified range listed in the default eMIB. If the newly provisioned operating parameters do not fall within a specified range listed in the default eMIB, then the default eMIB operating parameters are maintained in the dynamic eMIB at block 510. However, if the newly determined operating parameters do fall within a specified range listed in the default eMIB, then the newly determined operating parameters are adopted into the dynamic eMIB at block 512. Subsequently, the process ends at block 514.

Figure 6:
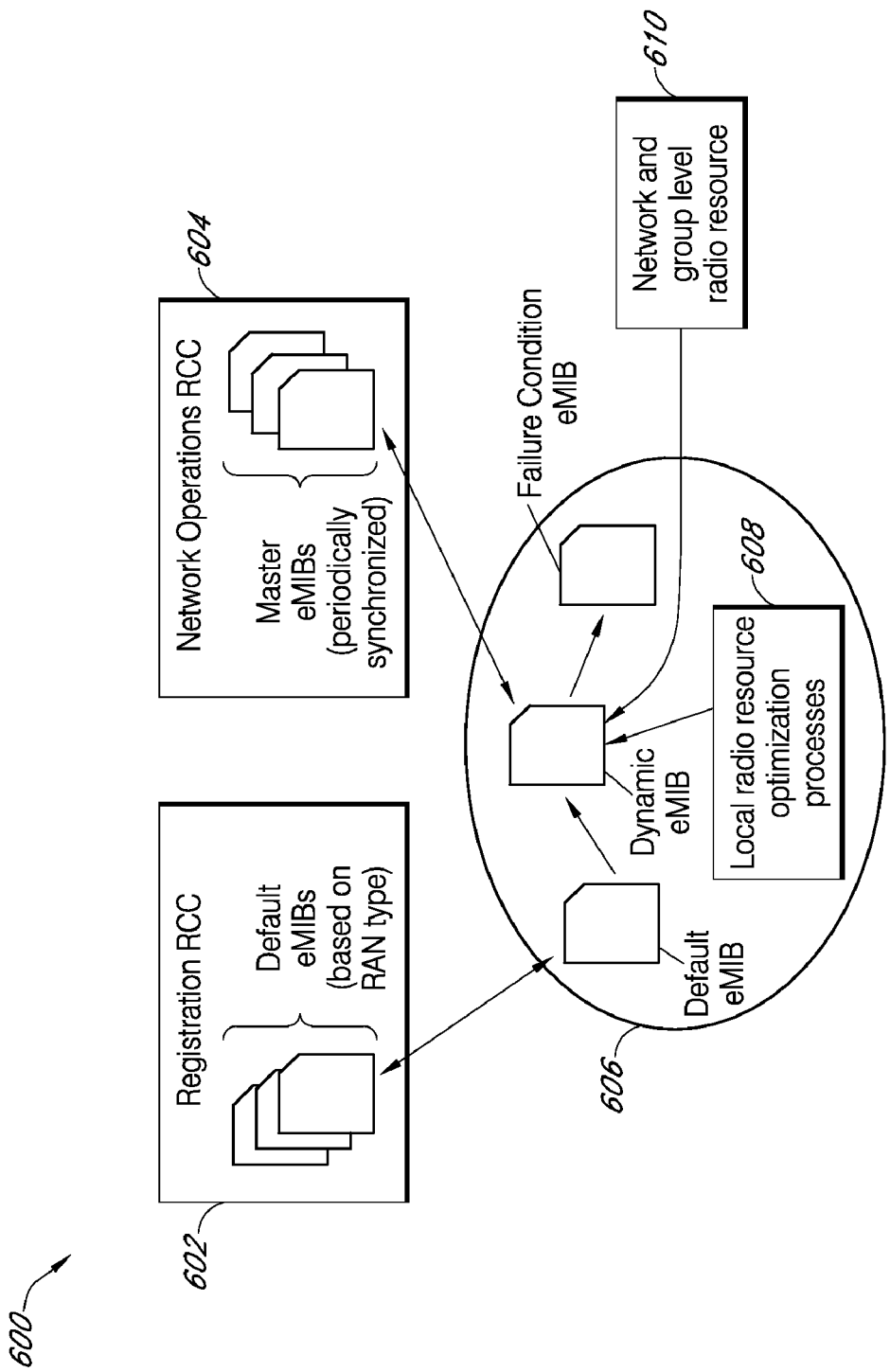
FIG. 6 illustrates a system-level schematic of eMIB configuration processes as well as a system failure condition response, in accordance with an embodiment of the present invention.

FIG. 6 illustrates a networked system 600 depicting various eMIB configuration processes, as well as a system failure condition response process, in accordance with an embodiment of the present invention. In an embodiment, the system may include a registration RCC 602 (e.g., a registration authentication server, a TR-069 AGW) that maintains a repository of default eMIBs related to particular RAN types (e.g., macro, micro, pico, and femto RAN types), a network operations RCC 604 that maintains a repository of master eMIBs, which may be periodically synchronized with dynamic eMIBs of network RANs by communications with the RANs, and a local RAN 606 that maintains one or more default eMIB, dynamic eMIB, and failure condition eMIB.

In an embodiment, during an initial provisioning process (e.g., part of a network discovery process), the registration RCC 602 may communicate with the local RAN 606 to determine what type of device the RAN is, and what cell coverage the local RAN 606 is capable of providing. During automatic provisioning, the registration RCC 602 may transmit a default eMIB to the local RAN 606 to allow one or more RCCs or service provider entities to manage the local RAN 606 (e.g., during typical cellular network operations procedures). The received default eMIB may be utilized by the local RAN 606 to set boundaries/ranges for various network operating parameters designated in the RAN's dynamic eMIB. In this scenario, the dynamic eMIB may hold real-time network operating parameters and settings that are routinely updated in response to various local self-optimization procedures 608 (e.g., various self-optimization procedures associated with common SoN network RAN optimization procedures).

In an embodiment, the local self-optimization procedures 608 (corresponding with component 312 of FIG. 3) may be configured to optimize/update: neighbor RAN lists based on local measurements, preferred channel list based on local measurements, handover threshold settings based on local handover success/failure history, and access parameter settings based on local call success/failure history. As would be understood by those skilled in the Art, there may be many other potential parameters that can be managed via local RAN processes but with oversight, optimization, and limits set by regional and/or global processes.

Further, the received default eMIB may be utilized by the local RAN 606 to facilitate a rollback procedure associated with a network failure condition recovery process. This rollback procedure may allow the local RAN 606 to readily revert to a "stock" provisioned state when required by a controlling RCC or service provider entity. The local RAN's 606 dynamic eMIB may be provisioned from a copy of the default eMIB (importing the parameters of the default eMIB into the dynamic eMIB for initial operations, prior to self-optimization procedures).

In an embodiment, the dynamic eMIB of the local RAN 606 may be optimized by network and group level procedures 610 (corresponding with components 410 and 416 of FIG. 4) that may be configured to optimize/update parameters associated with: white listed or black listed neighbor cells based on regional network planning, reserved channels not available for local use (regardless of observed channel quality) based on regional load balancing and resource distribution provisioning, limits to handover threshold settings based on regional handover stability and regional optimization (max min: add, drop thresholds, time to drop, time to add, etc.), and limits to access parameter settings based on regional network access stability and regional optimization (max min: thresholds, timers, etc.).

In an embodiment, the local RAN 606 may be configured to periodically store a copy of its dynamic eMIB in the network operations RCC 604 (e.g., during a synchronization procedure or during a network failure condition procedure). During a network failure condition, the local RAN 606 may be instructed by either the registration RCC 602 or by the network operations RCC 604 to store its dynamic eMIB with the network operations RCC 604, thereby effectively freezing its run-time operating state at the time it was informed of the network failure. Subsequently, the local RAN 606 may be instructed to use a temporary failure condition eMIB that can be provisioned by a network RCC (e.g., either of RCCs 602 or 604) to minimize network deficiencies associated with the failure. As would be understood by those skilled in the Art, typically this would result in an elevation of RAN radio operating level parameters to compensate for downed network equipment (e.g., neighboring RANs in a fault state). Further, after the network failure condition has cleared, the local RAN 606 may be instructed by a RCC to revert to either the default RAN (e.g., by provisioning a new dynamic eMIB to be in compliance with the default eMIB configuration), or to revert to the saved prefault copy of the dynamic eMIB saved with the network operations controller 604. Either recovery process may provide distinct advantages for a service provider, when trying to optimize network resources after a network failure.

Figure 7:
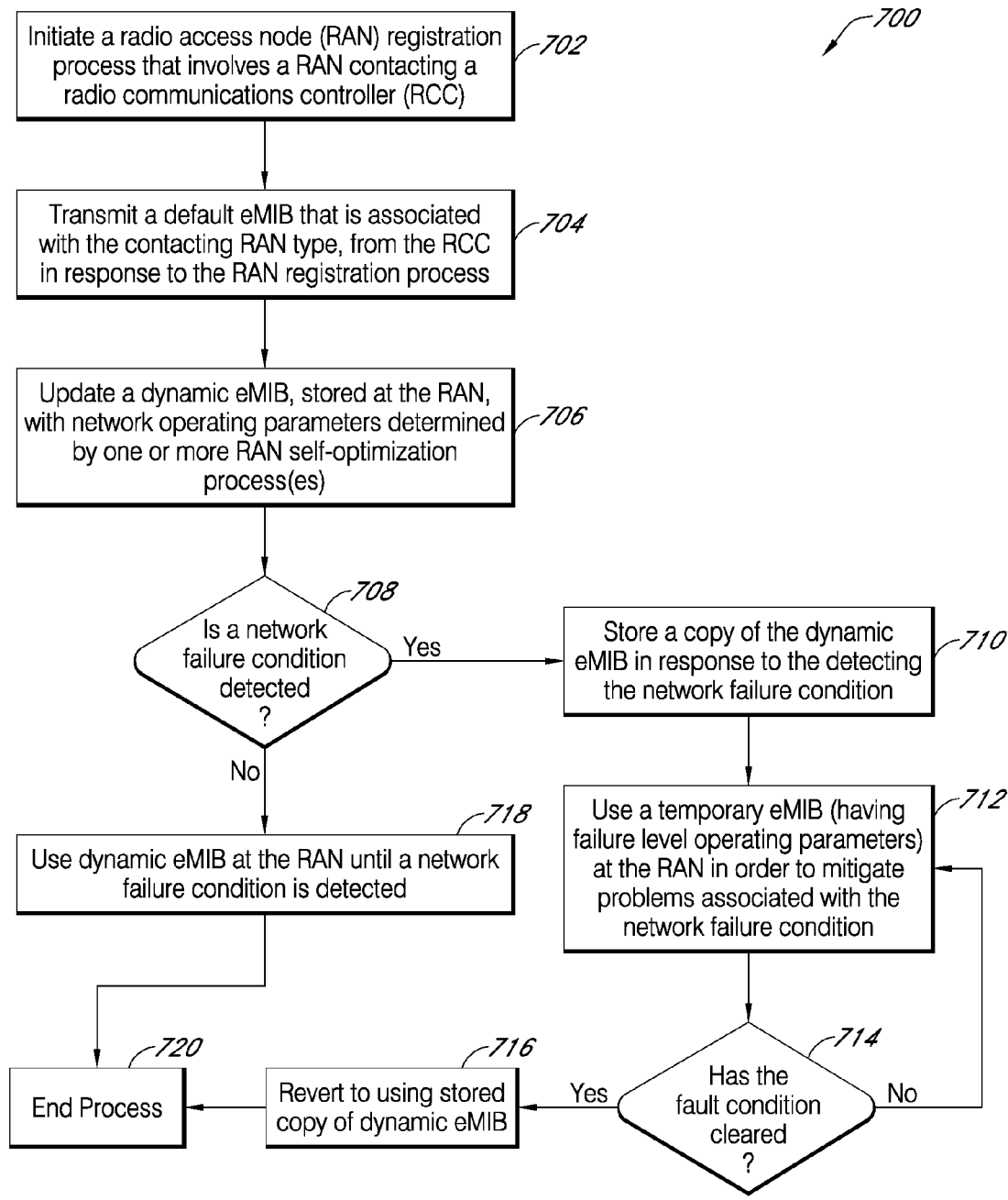
FIG. 7 illustrates a flow diagram depicting eMIB configuration processes as well as a system failure condition response, in accordance with an embodiment of the present invention.

FIG. 7 illustrates a flow diagram 700 depicting eMIB configuration processes as well as a system failure condition response, in accordance with an embodiment of the present invention. It should be understood that this process 700 could be executed using one or more computer-executable programs stored on one or more computer-readable media located on any of the network computing system's 100 base stations 106*a-c*, 118, 120, and 122 and/or controller devices 110, 112 and 114 of FIG. 1. At block 702, a RAN registration process is initiated that involves a RAN 300 contacting RCC 400. Then at block 704, a default eMIB associated with the contacting RAN type is transmitted from the RCC 400 to the RAN 300, in response to the RAN registration process. Next, at block 706, a dynamic eMIB stored at the RAN is updated with network operating parameters determined by one or more RAN self-optimization process(es).

Subsequently, at decision block 708, it is determined if a network failure condition is detected. If a network failure condition is detected, then a copy of the dynamic eMIB is stored in response to the detection of the network failure condition at block 710. Next the process proceeds to block 712, where a temporary eMIB (having failure level operating parameters stored therein) is used at the RAN in order to mitigate problems associated with the network failure condition. Subsequently, the process proceeds to decision block 714, where it is determined if the network failure condition has cleared. If the network failure condition has not cleared, then the RAN will continue to use the temporary eMIB at block 712. If the network failure condition has cleared, then the RAN reverts to using the stored copy of the dynamic eMIB at block 716. Subsequently, that branch of the process ends at block 720. However, if a network failure condition is not detected at decision block 708, then a copy of the dynamic eMIB is stored in response to the detection of the network failure condition at block 710. Next at block 718, the dynamic eMIB is utilized at the RAN until a fault condition is detected. Subsequently, that branch of the process ends at block 720.

In an embodiment, one or more RANs may independently receive default eMIBs during automated device registration/authentication events and the radio parameters in the default eMIBs may be associated with network and/or group level radio operating parameters designated by a particular service provider. Subsequent RCC management, utilizing the definitions and/or the permissible parameter ranges in the default eMIBs may provide a framework to support automation and self-optimization of RANs within a radio access network, without relinquishing centralized control over individual parameters, particularly when necessary or desired by a network service provider.

Modern parameter management systems require significant manual intervention from a centralized location within a data communications network. This can create many problems related to localized, self-optimization functionality in emerging 4G networks. Increased system complexity, resulting from centralized RAN management systems may effectively preclude localized self-organizing functions, such as rapid self-healing operations and localized self-optimization. The present invention cures these deficiencies and provides a decentralized RAN management system facilitating many beneficial localized, self-organizing functions.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system that utilizes extended management information base (eMIB) data to optimize network resources, comprising:
   a plurality of radio access nodes (RANs);
   a plurality of radio communications controllers (RCCs); and
   a data communications network facilitating data communications amongst the plurality of RAN s and the plurality of RCCs,
   wherein a first RAN receives a default eMIB associated with a cell type of the first RAN from a first RCC in response to a registration event of a RAN initialization process, and
   wherein in response to a network failure condition, the first RAN is instructed by a second RCC to save a copy of its dynamic eMIB, such that it can revert back to using the saved copy during a failure recovery process.

2. The networked computing system of claim 1, wherein a second RAN receives a default eMIB associated with a cell type of the second RAN from the first RCC in response to a registration event of a RAN initialization process.

3. The networked computing system of claim 1, wherein the first RCC maintains default eMIBs associated with macrocell, microcell, picocells, and femtocell RANs.

4. The networked computing system of claim 1, wherein the first RAN maintains a dynamic eMIB comprising network operating parameters determined by at least one self-optimization process.

5. The networked computing system of claim 4, wherein a first network operating parameter of the dynamic eMIB is selected to fall within a range designated by the default eMIB associated with a cell type of the first RAN.

6. The networked computing system of claim 1, wherein during a network failure condition, the first RAN is configured to use a temporary eMIB comprising failure level operating parameters, to mitigate network deficiencies caused by the network failure condition.

7. A non-transitory computer-readable medium encoded with computer-executable instructions that utilize extended management information base (eMIB) data to optimize network resources, which when executed, performs the method comprising:
   registering a first radio access node (RAN) with a radio communications controller (RCC) during a RAN initialization process; and
   receiving a default eMIB associated with a cell type of the first RAN at the first RAN, in response to the registration,
   wherein in response to a network failure condition, the first RAN is instructed by a second RCC to save a copy of its dynamic eMIB, such that it can revert back to using the saved copy during a failure recovery process.

8. The non-transitory computer-readable medium of claim 7, wherein the method further comprises:
   receiving a default eMIB associated with a cell type of a second RAN at the second RAN, in response to the registering the second RAN with the RCC.

9. The non-transitory computer-readable medium of claim 7, wherein the RCC maintains default eMIBs associated with macrocell, microcell, picocells, and femtocell RANs.

10. The non-transitory computer-readable medium of claim 7, wherein the first RAN maintains a dynamic eMIB comprising network operating parameters determined by at least one self-optimization process.

11. The non-transitory computer-readable medium of claim 10, wherein a first network operating parameter of the dynamic eMIB is selected to fall within a range designated by the default eMIB associated with the cell type of the first RAN.

12. The non-transitory computer-readable medium of claim 7, wherein during a network failure condition, the first RAN is configured to use a temporary eMIB comprising failure level operating parameters, to mitigate network deficiencies caused by the network failure condition.

13. A computer-implemented method that utilizes extended management information base (eMIB) data to optimize network resources, the method comprising:
   registering a first radio access node (RAN) with a radio communications controller (RCC) during a RAN initialization process; and
   receiving a default eMIB associated with a cell type of the first RAN at the first RAN, in response to the registration, wherein in response to a network failure condition, the first RAN is instructed by a second RCC to save a copy of its dynamic eMIB, such that it can revert back to using the saved copy during a failure recovery process.

14. The computer-implemented method of claim 13, wherein the method further comprises:
receiving a default eMIB associated with a cell type of a second RAN at the second RAN, in response to the registering the second RAN with the RCC.

15. The computer-implemented method of claim 13, wherein the first RCC maintains default eMIBs associated with macrocell, micro cell, picocells, and femtocell RANs.

16. The computer-implemented method of claim 13, wherein the first RAN maintains a dynamic eMIB comprising network operating parameters determined by at least one self-optimization process.

17. The computer-implemented method of claim 16, wherein a first network operating parameter of the dynamic eMIB is selected to fall within a range designated by the default eMIB associated with the cell type of the first RAN.

* * * * *